United States Patent [19]

Oshima et al.

[11] Patent Number: 5,155,985
[45] Date of Patent: Oct. 20, 1992

[54] WORKING VEHICLE CONTROLLABLE BY WALKING OPERATOR AND HAVING INDEPENDENTLY DRIVEN RIGHT AND LEFT GROUND WHEELS

[75] Inventors: Hiroshi Oshima; Junichi Kitamura; Hirofumi Sadakane; Yoshio Tomiyama; Hideo Okura, all of Sakai, Japan

[73] Assignee: Kubota Corporation, Osaka, Japan

[21] Appl. No.: 775,661

[22] Filed: Oct. 10, 1991

Related U.S. Application Data

[63] Continuation-in-part of Ser. No. 702,661, May 17, 1991.

[30] Foreign Application Priority Data

Oct. 16, 1990 [JP] Japan .......................... 2-108730[U]

[51] Int. Cl.[5] .............................................. A01D 34/00
[52] U.S. Cl. .................................... 56/10.8; 56/11.3
[58] Field of Search ...................... 56/10.2, 10.8, 11.3, 56/11.5, 11.6, 11.8, 16.9, DIG. 4, DIG. 15

[56] References Cited

U.S. PATENT DOCUMENTS

| | | | |
|---|---|---|---|
| 3,608,285 | 9/1971 | Beirk ..................................... | 56/10.2 |
| 3,626,676 | 12/1971 | Miley et al. .......................... | 56/10.2 |
| 3,773,156 | 11/1973 | Nyquist ................................ | 56/10.2 X |
| 4,300,332 | 11/1981 | Jackson .............................. | 56/11.6 X |
| 4,760,685 | 8/1988 | Smith .................................. | 56/10.8 X |
| 4,879,867 | 11/1989 | Wenzel ............................... | 56/11.3 X |
| 4,934,989 | 6/1990 | Furukawa et al. .................... | 474/135 |
| 5,020,308 | 6/1991 | Braun et al. ......................... | 56/11.3 |
| 5,086,890 | 2/1992 | Turgeyn et al. ................... | 56/11.3 X |

Primary Examiner—Thuy M. Bui
Attorney, Agent, or Firm—Jordan and Hamburg

[57] ABSTRACT

A lawn mower controllable by a walking operator and having two control levers each for controlling a brake and a propelling clutch. Each control lever is pivotable to a "run" position to engage the clutch and render the brake inoperative, a "neutral" position to disengage the clutch and render the brake inoperative, and a "stop" position to disengage the clutch and operate the brake. Each control lever is constantly urged to the "stop" position by a spring. The lawn mower further includes a locking lever for maintaining the control levers in the respective "neutral" positions and "stop" positions. The lawn mower is driven by an engine to engage in a grass cutting operation with the control levers maintained in the "run" positions by the urging springs. The operator may push the mower to engage in a grass cutting operation with the control levers maintained in the "neutral" positions by the locking lever. When the control levers are locked to the "stop" positions by the locking lever, the lawn mower is stopped to allow the operator to engage in a different operation.

6 Claims, 5 Drawing Sheets

WORKING VEHICLE CONTROLLABLE BY WALKING OPERATOR AND HAVING INDEPENDENTLY DRIVEN RIGHT AND LEFT GROUND WHEELS

REFERENCE TO RELATED APPLICATION

This is a continuation-in-part of application Ser. No. 07/702,661, filed May 17, 1991.

BACKGROUND OF THE INVENTION

1. Field of the Invention

The present invention relates to a working vehicle controllable by a walking operator and having a motor, a pair of right and left drive wheels, a drive transmission system for transmitting drive from the motor to the drive wheels, braking devices for braking the respective drive wheels, and control levers for controlling the braking devices and the drive transmission to the drive wheels.

2. Description of the Related Art

A working vehicle of the type noted above often takes the form of a lawn mower controllable by a walking operator as disclosed in U.S. Pat. No. 4,934,989, for example.

This lawn mower includes right and left control levers attached to a steering handle, and the right lever is interlocked with a right clutch and brake while the left lever is interlocked with a left clutch and brake. The right clutch and brake and the left clutch and brake are operable independently of each other by selecting control positions of the control levers. The mower may run in a self-propel mode by engaging the clutches, may be pushed by the operator when the clutches are disengaged, and may be stopped by applying the brakes.

In such a construction, generally, the right and left levers are urged to "run" positions (with the clutches engaged and the brakes released). To carry out a grass cutting operation in a push mode or to stop the mower, the operator must hold the steering handle and at the same time hold the right and left control levers in "push" positions or "stop" positions with his or her hands.

SUMMARY OF THE INVENTION

The object of the present invention is to simplify operation of the right and left control levers for selecting the self-propel, push or stop mode.

The above object is fulfilled, according to the present invention, by a working vehicle controllable by a walking operator, comprising:

a first control lever movable by a "run" position to permit driver transmission to a left drive wheel, a "neutral" position to prohibit the drive transmission to the left drive wheel, and a "stop" position to operate a brake, a second control lever movable to a "run" position to permit drive transmission to a right drive wheel, a "neutral" position to prohibit the drive transmission to the right drive wheel, and a "stop" position to operate a brake, these control levers being urged to the respective "run" positions, and a locking device operable to lock the control levers in the "neutral" positions and the "stop" positions.

Since the locking device is provided to maintain the right and left control levers in the "neutral" positions or "stop" positions, the operator may release the control levers as maintained in either of these positions. Thus, the operator need not hold, with his or her hands, the right and left control levers in the "neutral" positions, but may release the control levers and push the lawn mower by holding only a steering handle. When the right and left control levers are maintained in the "stop" positions, the operator may temporarily leave the lawn mower.

Preferably, the brakes are released when the control levers are in the "run" positions or "neutral" positions, and applied to prohibit the drive transmission to the drive wheels when the control levers are in the "stop" positions.

Further, the locking device may include movable arms engaged with the first and second control levers, respectively, each of the arms being movable between a "lock" position to maintain the associated control lever in the "neutral" position and the "stop" position, and an "unlock" position to release the control lever. The right and left control levers become independently operable by switching the arms to the "unlock" positions. This allows the lawn mower to make a large, gentle turn by prohibiting drive transmission to one of the drive wheels, and to make a small, sharp turn by braking one of the drive wheels.

Other features and advantages of the present invention will be apparent from the following description of the preferred embodiment to be had with reference to the drawings.

DETAILED DESCRIPTION OF THE PREFERRED EMBODIMENT

Figure 1:
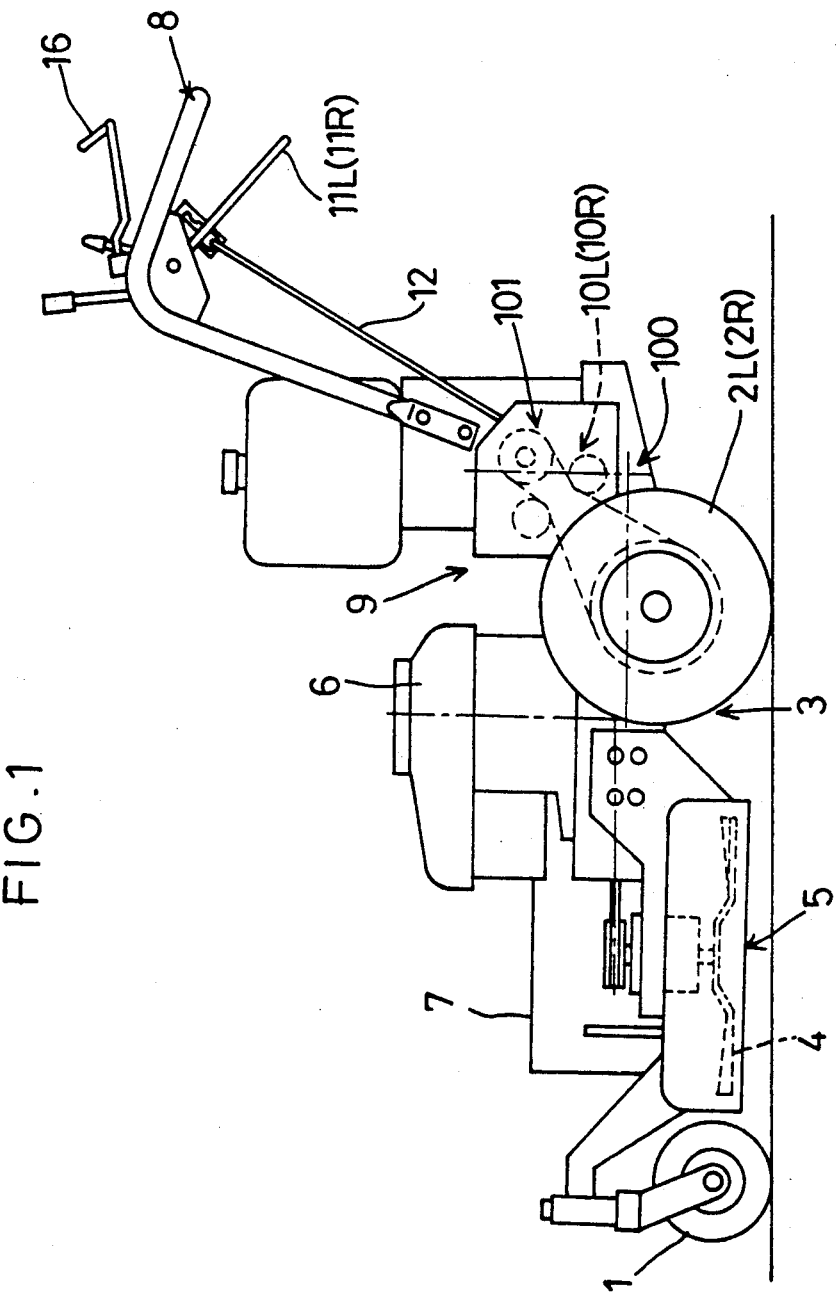
FIG. 1 is a side elevation of the lawn mower controllable by a walking operator.

FIG. 1 shows a self-propelling lawn mower which is one type of working vehicles controllable by a walking operator. This lawn mower includes right and left front wheels 1, right and left rear wheels 2R and 2L, and a chassis 3 supported by the front and rear wheels. The chassis 3 carries a grass cutting unit 5 mounted on a lower position thereof and including two rotary cutting blades 4. The chassis 3 further carries an engine 6 mounted centrally thereof, a grass collecting bag 7 mounted laterally, and a steering handle 8 extending rearwardly of the chassis 3.

Figure 2:
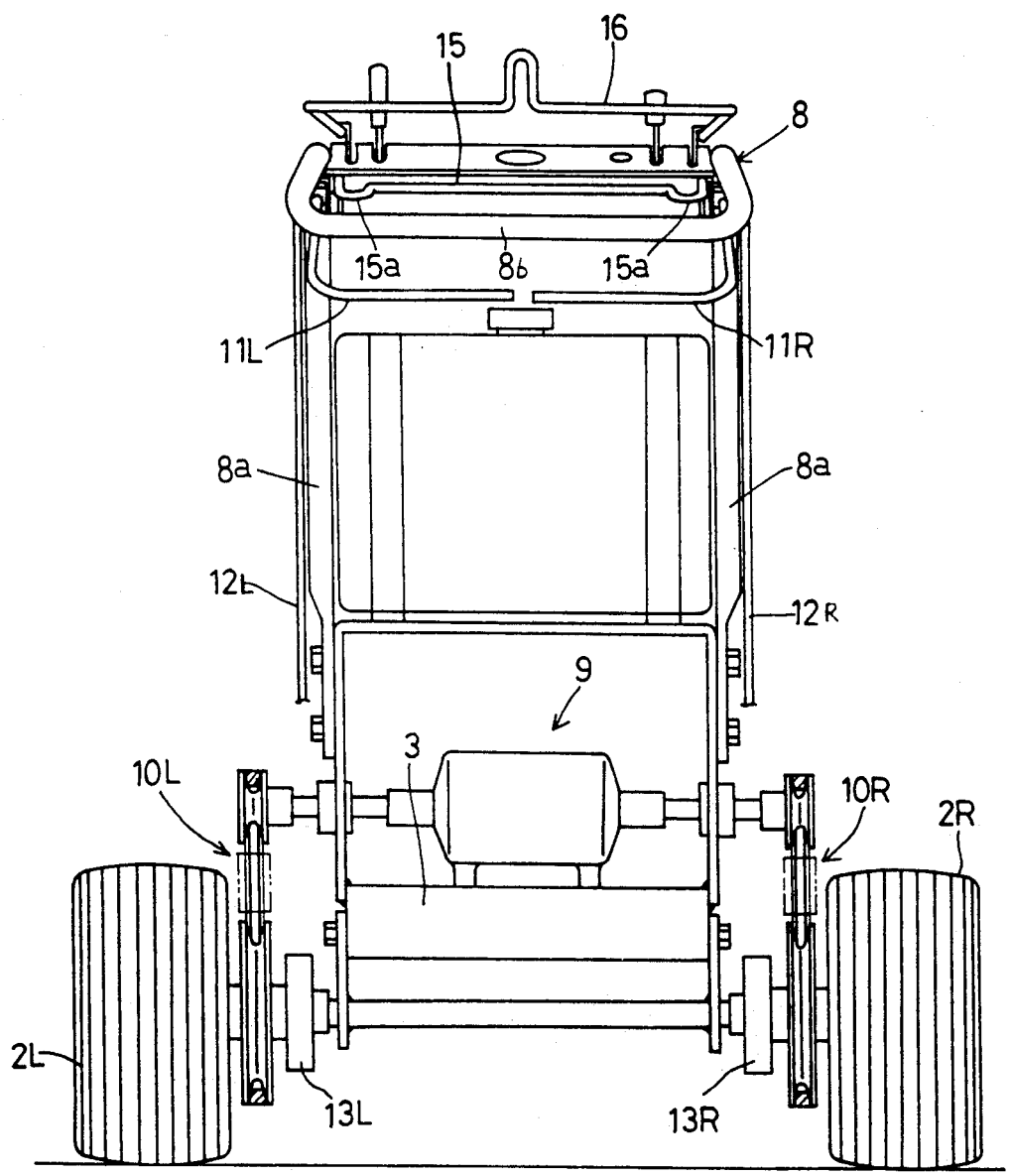
FIG. 2 is a rear view showing clutches, brakes and a steering handle.

This lawn mower has the following propelling drive transmission structure. Referring to FIG. 1, drive of the engine 6 is transmitted to a rear transmission 9 through a primary propelling system 100 shown in a dot-and-dash line. The transmission 9 includes a change speed gear mechanism (not shown) operable to effect backward/forward drive switching. Forward or backward drive is transmitted from the transmission 9 to right and left secondary propelling systems 101 for driving the right and left rear wheels 2R and 2L, respectively. Each of the secondary propelling systems 101 is a belt transmission system including a tightener type clutch 10R or 10L. As shown in FIG. 2, brakes 13R and 13L are provided for the right and left rear wheels 2R and 2L, respectively. Controls of these clutches and brakes will be described later.

Figure 4:
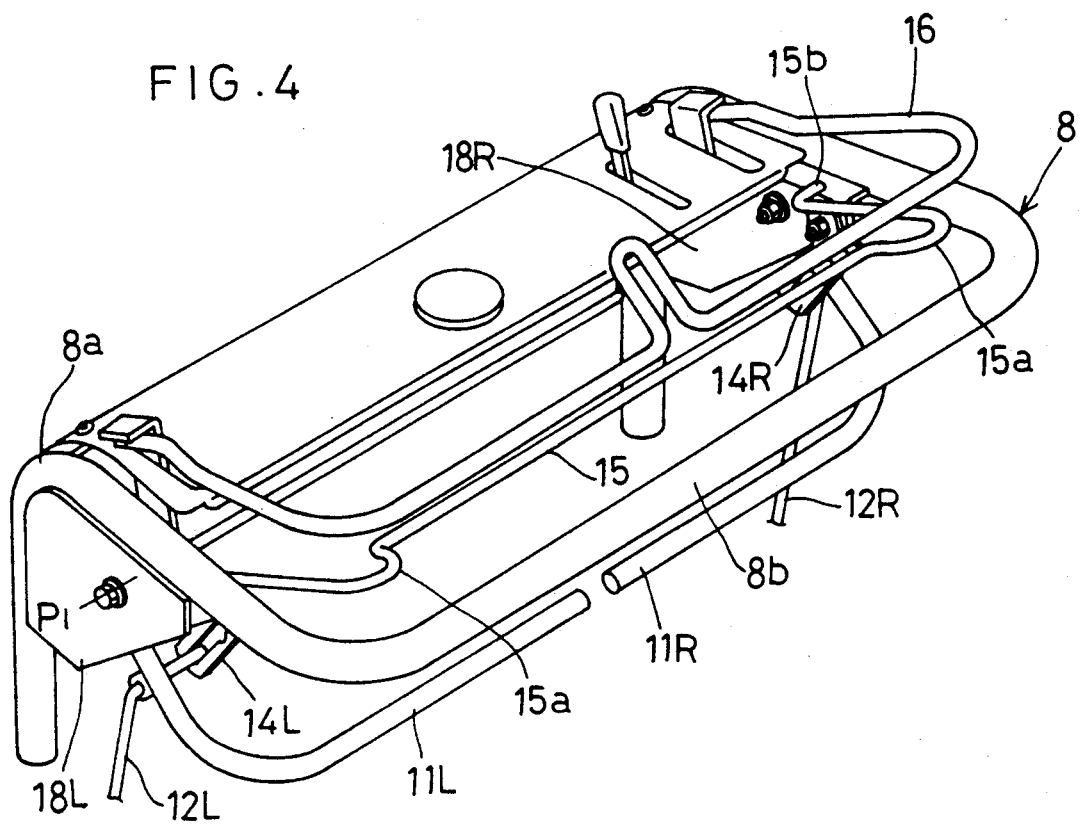
FIG. 4 is a perspective view showing the steering handle and control levers.

Structures around the steering handle 8 will be described next. As shown in FIGS. 1, 2 and 4, the steering handle 8 as a whole has a shape curved rearwardly of the mower, and includes vertical bar portions 8a extending upwardly and rearwardly from the chassis 3, and a cross bar portion 8b extending transversely of the mower and bridging ends of the vertical bar portions 8a. Right and left control levers 11R and 11L, each L-shaped in a plan view, extend substantially along the steering handle 8. To be swingable independently of each other, the respective control levers 11R and 11L have proximal ends thereof pivoted about a transverse axis P1 defined in brackets 18R and 18L fixed to the right and left bar portions 8a. Distal ends of the control levers 11R and 11L are spaced from each other adjacent a mid-portion of the cross bar portion 8b.

The right and left control levers 11R and 11L are connected through right and left interlocking rods 12R and 12L to the right and left clutches 10R and 10L and brakes 13R and 13L, respectively. The clutches 10R and 10L are brakes 13R and 13L are controllable by swinging movement of the control levers 11R and 11L, as briefly described below with reference to FIGS. 3A and 3B.

Figure 3A:
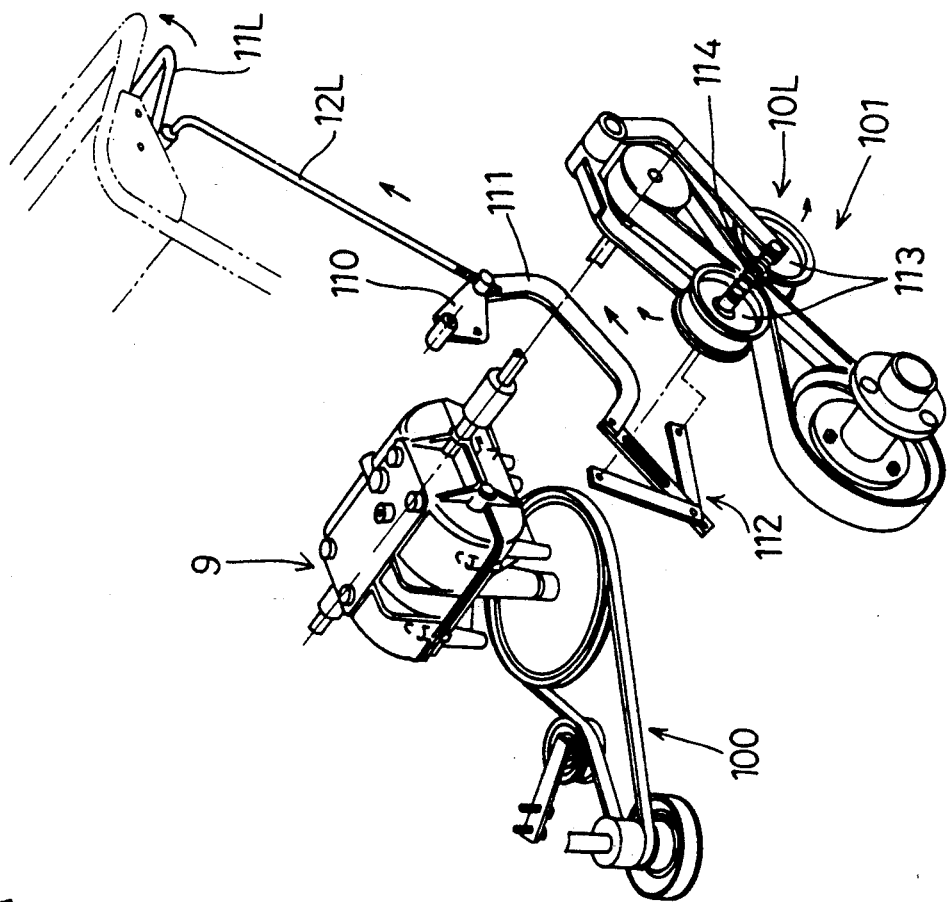
FIG. 3A is a perspective view showing a clutch operating system.
Figure 3B:
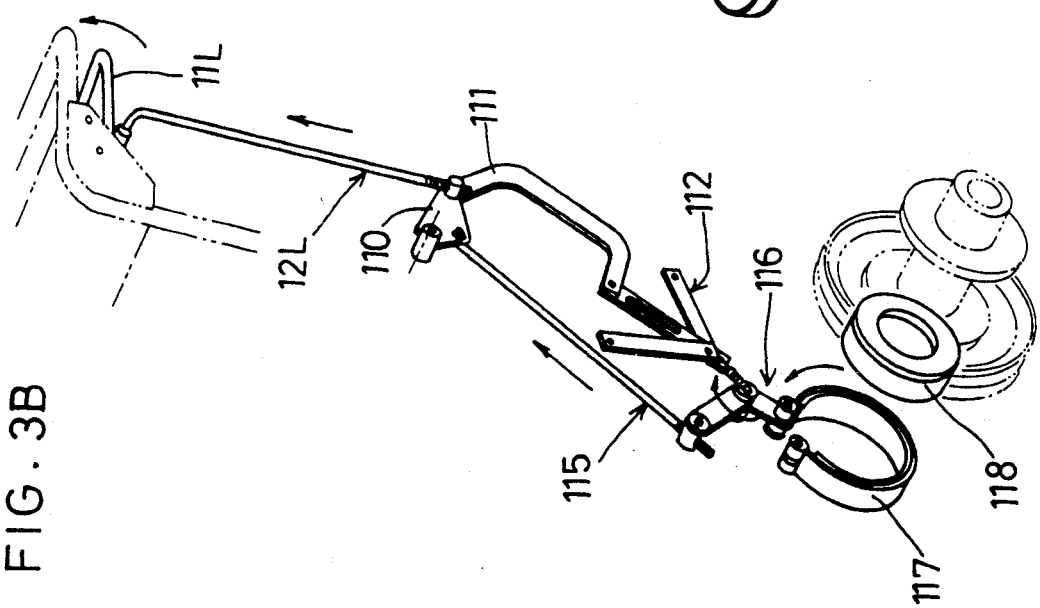
FIG. 3B is a perspective view showing a brake operating system.

FIGS. 3A and 3B show only the left side of the lawn mower, and only the elements provided on that side will be described. It will be appreciated that, of course, similar elements are provided on the right side of the mower also.

FIG. 3A shows a control system for the clutch included in the secondary propelling system 101. The interlocking rod 12L is connected at a lower end thereof to a plate 110 oscillatable on a horizontal axis. The oscillatable plate 110 is connected through a link plate 111 to an oscillatable link mechanism 112 of the tightener type clutch 10L. The oscillatable link mechanism 112 has two tension pulleys 113. When the interlocking rod 12L is pulled up, the tension pulleys 113 move away from each other to relax tension of the belt. A tension spring 114 extends between the tension pulleys 113 to constantly press the tension pulleys 113 against the belt. Consequently, the tension spring 114 acts through the interlocking rod 12L to urge the control lever 11L to a "run" position.

FIG. 3B shows a control system for the brake 13L, which actually is in overlapping relation with the control system shown in FIG. 3A. A brake arm 116 is connected through a brake rod 115 to the oscillatable plate 110. The brake rod 115 and clutch operating link plate 111 are connected to the oscillatable plate 110 at points different in distance from its axis of oscillation. The brake arm 116 is connected also to a brake band 117 of the brake 13L. When the interlocking rod 12L is pulled up in excess of a predetermined amount, the brake band 117 contacts a brake drum 118 to brake the rear wheel.

The control link structure shown in FIGS. 3A and 3B is designed to cause on/off operation of the clutch 10L and brake 13L in accordance with control positions of the control lever 11L. In particular, by a counterclockwise swing of the control lever 11L, the clutch 10L is first disengaged and then the brake 13L is released.

A similar link structure is disclosed in detail in U.S. Pat. No. 4,934,989, for example.

Figure 5:
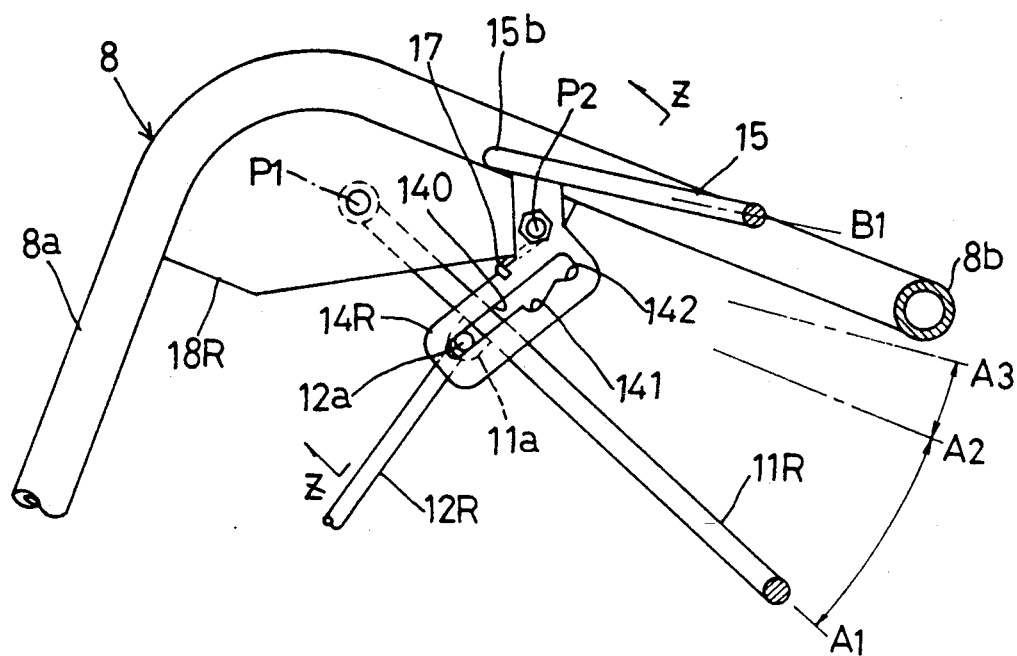
FIG. 5 is a side view showing a control lever in a "run" position and a lock controlling rod in an "unlock" position.

As seen from FIG. 5, when the control levers 11R and 11L are moved to "run" positions A1, the clutches 10R and 10L become engaged and the brakes 13R and 13L released. As a result, the lawn mower runs in a self-propel mode.

Figure 6:
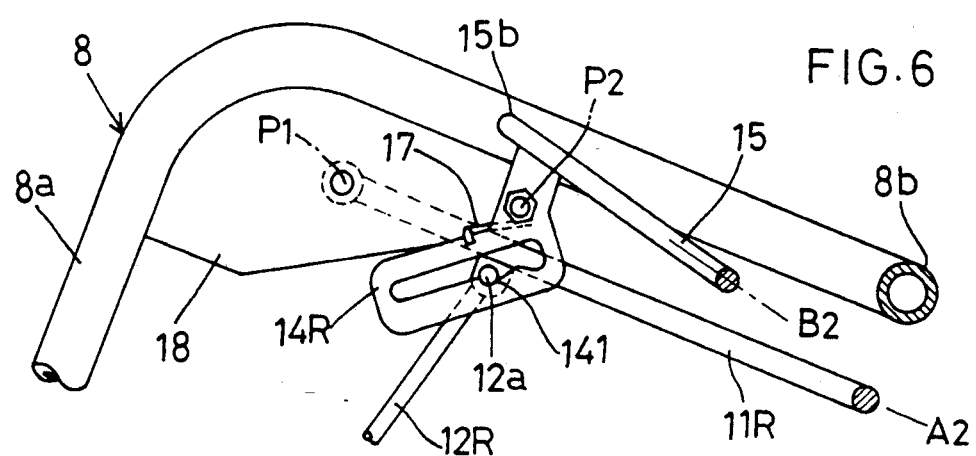
FIG. 6 is a side view showing the control lever in a "neutral" position.

As seen from FIG. 6, when the control levers 11R and 11L are moved to "neutral" positions A2, the interlocking rods 12R and 12L are pulled up a predetermined amount, which, through the link mechanisms, disengages the clutches 10R and 11L and releases the brakes 13R and 13L. It is therefore possible to cause the lawn mower to make a large, gentle turn by moving one of the control levers 11R and 11L to the "neutral" position A2 and the other to the "run" position A1. When both control levers 11R and 11L are moved to the "neutral" positions A2 to place the right and left rear wheels in a freely rotatable state, the operator may push along the lawn mower.

Figure 7:
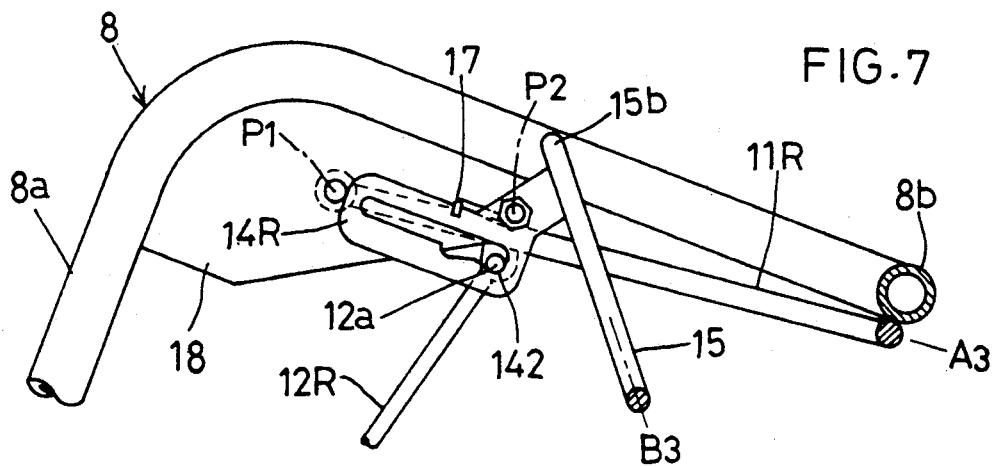
FIG. 7 is a side view showing the control lever in a "stop" position.

As seen from FIG. 7, when the control levers 11R and 11L are moved to "stop positions A3, the interlocking rods 12R and 12L are pulled up a further predetermined amount, which, through the link mechanisms, disengages the clutches 10R and 11L and applies the brakes 13R and 13L. It is therefore possible to cause the lawn mower to make a small, sharp turn by moving one of the control levers 11R and 11L to the "stop" position A3 and the other to the "run" position A1. The lawn mower may be stopped by moving both control levers 11R and 11L to the "stop" positions A3. As shown in FIG. 3, the belt transmissions are urged to a transmitting state by the springs 114. Consequently, the control levers 11R and 11L are urged to the "run" positions A1.

Figure 8:
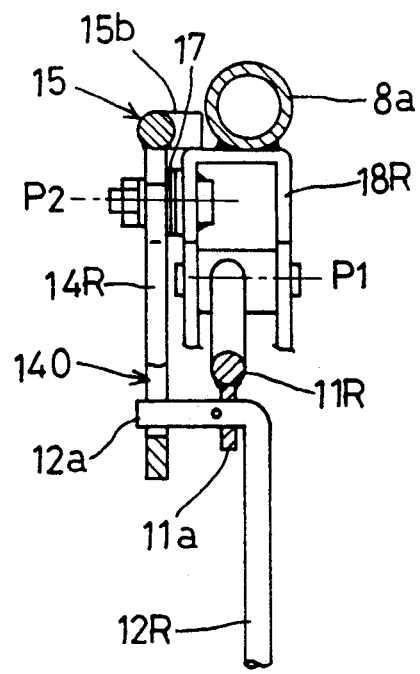
FIG. 8 is a sectional view seen in a direction Z—Z in FIG. 5.

A structure for maintaining the control levers 11R and 11L in the "neutral" positions A2 and "stop" positions A3 will be described next. Referring to FIG. 8 besides FIGS. 4 and 5, lock arms 14R and 14L are connected, to be pivotable about a transverse axis P2, to the right and left brackets 18R and 18L fixed to the steering handle 8. A lock controlling rod 15 extends between the right and left lock arms 14R and 14L and along the cross bar portion 8b of the handle 8. As shown in FIGS. 2 and 4, the lock controlling rod 15 includes curved projections 15a formed on opposite lateral regions thereof and projecting toward the cross bar portion 8b of the handle 8. This construction allows the operator to push one of the projections 15a with his or her thumb to swing the right and left lock arms 14R and 14L while holding the right and left vertical bar portions 8a. When holding the cross bar portion 8b of the handle 8, the operator may extend his or her hand a little and press the lock controlling rod 15 adjacent a center position thereof with a first or second finger to swing the right and left lock arms 14R and 14L.

The right and left lock arms 14R and 14L are interconnected through the long lock controlling rod 15 which is within easy reach of the steering handle 8. Thus, the operator may readily touch the lock controlling rod 15 by extending his or her hand a little whichever parts of the steering handle 8 the operator may be holding, thereby to control the right and left lock arms 14R and 14L simultaneously.

As shown in FIGS. 5 and 8, the interlocking rods 12R and 12L have L-shaped upper ends 12a extending through bores in brackets 11a secured to undersurfaces of the control levers 11R and 11L. These upper ends 12a extend further into slots 140 defined in the lock arms 14R and 14L. Consequently, the interlocking rods 12R and 12L, control levers 11R and 11L and lock arms 14R and 14L are operatively connected to one another.

The way in which the control levers 11R and 11L in the respective control positions are interlocked with the lock controlling rod 15 will be described next with reference to FIGS. 5 through 8. All of these figures show only the elements provided on the right side of the mower, and similar elements provided on the left side are identified in the following description by affixing "L" to the reference numerals.

FIG. 5 shows the lock arm 14R (14L) in an "unlock" position B1. In this position, the upper end 12a of the interlocking rod 12R (12L) is movable, with a counterclockwise swing of the control lever 11R (11L), from a lower end to an upper end of the slot 140 to the lock arm 14R (14L). The right and left control levers 11R and 11L are movable independently of each other to selected control positions, i.e. the "run" positions A1, "neutral" positions A2 and "stop" positions A3.

As seen from FIGS. 5, 6 and 7, the slot 140 of the lock arm 14R (14L) includes a first recess 141 defined at a distance of about ⅔ of its entire length from the lower end, and a second recess 142 at the upper end thereof, both recesses extending transversely of the slot 140.

FIG. 6 shows a state in which the control lever 11R (11L) lies in the "neutral" position A2, and the lock arm 14R (14L) is operated to a "lock" position B2. In this state, the first recess 141 of the lock arm 14R (14L) receives the upper end 12a of the interlocking rod 12R (12L). As a result, the control lever 11R (11L) is locked in the "neutral" position A2.

FIG. 7 shows a state in which the control lever 11R (11L) lies in the "stop" position A3, and the lock arm 14R (14L) is operated to a "lock" position B3. In this state, the second recess 142 of the lock arm 14R (14L) receives the upper end 12a of the interlocking rod 12R (12L). As a result, the control lever 11R (11L) is locked in the "stop" position A3.

A helical spring 17 is attached to one of the lock arms 14R to urge this lock arm counterclockwise in the drawings. When, in the state shown in FIG. 6 or 7, the control lever 11R (11L) is lifted a little, the upper end 12a of the interlocking rod 12R (12L) moves upward out of the first or second recess 141 or 142. Then the lock arm 14R (14L), under the urging force of the helical spring 17, returns to the "unlock" position B1 shown in FIG. 1. At this time, an extension 15b at an end of the lock controlling rod 15 contacts an upper surface of the bracket 18 (FIG. 5) to maintain the lock controlling rod 15 and lock arm 14R (14L) in the "unlock" position B1. The helical spring 17 has a predetermined spring constant to hold the lock arm 14R (14L) against a pulling force of the interlocking rod 12R (12L) when the upper end 12a engages the first or second recess.

As shown in FIGS. 2 and 4, this embodiment further includes a safety handle 16 disposed above the steering handle 8 and having approximately the same shape as the handle 8. The operator lowers the safety handle 16 to the steering handle 8, and holds the two handles together during a grass cutting operation. If the operator should fall down and release the steering handle 8 and safety handle 16, the safety handle 16 would move upward, causing the engine 6 to stop automatically.

In the foregoing embodiment, the present invention is applied to a lawn mower controllable by a walking operator and having wheels as the running device. The present invention is applicable also to a working vehicle such as a cultivator controllable by a walking operator and having a pair of rubber crawlers as the running device.

What is claimed is:

1. A working vehicle controllable by a walking operator, comprising:

a motor, a pair of right and left drive wheels, a drive transmission system for transmitting drive from said motor to said drive wheels, brake means for braking said drive wheels, respectively, first control lever means for controlling said brake means and drive transmission to said left drive wheel, said first control lever means being movable to a "run" position to permit the drive transmission to said left drive wheel, a "neutral" position to prohibit the drive transmission to said left drive wheel, and a "stop" position to operate said brake means, second control lever means for controlling said brake means and drive transmission to said right drive wheel, said second control lever means being movable to a "run" position to permit the drive transmission to said right drive wheel, a "neutral" position to prohibit the drive transmission to said right drive wheel, and a "stop" position to operate said brake means, urging means for urging said first and second control lever means to the respective "run" positions, and lock means operable to lock said first and second control lever means in said "neutral" positions and said "stop" positions.

2. A working vehicle as claimed in claim 1, wherein said first control lever means is operable to render said brake means operative when in said "run" position and in said "neutral" position, and to prohibit the drive transmission to said left drive wheel when in said "stop" position, and said second control lever means is operable to render said brake means operative when in said "run" position and in said "neutral" position, and to prohibit the drive transmission to said right drive wheel when in said "stop" position.

3. A working vehicle as claimed in claim 1, wherein said lock means includes movable arms engaged with said first control lever means and said second control lever means, each of said arms being movable between a "lock" position to maintain said control lever means in said "neutral" position and said "stop" position and an "unlock" position to release said control lever means.

4. A working vehicle as claimed in claim 3, wherein each of said arms defines a slot for receiving a portion of said control lever means and allowing movement of said control lever means, said slot including recesses extending transversely of said slot at positions thereof corresponding to said "stop" position and said "neutral" position of said control lever means.

5. A working vehicle as claimed in claim 4, wherein said first and second control lever means include right and left levers pivotable on a horizontal axis, and rods pushed and pulled by pivotal movement of said levers, respectively.

6. A working vehicle controllable by a walking operator, comprising:
a motor,
a pair of right and left drive wheels,
a first and a second drive transmission systems for transmitting drive from said motor to said drive wheels,
a first and a second clutched mounted in said drive transmission systems, respectively,
first and second brake means for braking said drive wheels, respectively,
first and second control lever means for controlling said first and second brake means and said first and second clutches, said control lever means including levers pivotable on an axis, and rods pushed and pulled by pivotal movement of said levers, said rods being operatively connected to said clutches and said brake means, respectively, said first control lever means being pivotable to a "run" position to engage said first clutch and render said first brake means inoperative, a "neutral" position to disengage said first clutch and render said first brake means inoperative, and a "stop" position to disengage said first clutch and operate said first brake means,
said second control lever means being pivotable to a "run" position to engage said second clutch and render said second brake means inoperative, a "neutral" position to disengage said second clutch and render said second brake means inoperative, and a "stop" position to disengage said second clutch and operate said second brake means,
urging means for urging said first and second control lever means to the respective "run" positions, and
lock means switchable between a position to lock said first and second control lever means in said "neutral" positions and said "stop" positions and a position to allow the pivotal movement of said control lever means.

* * * * *